A. Barrows,
Sad Iron,
Nº 82,677. Patented Oct. 6, 1868.
Fig 1.
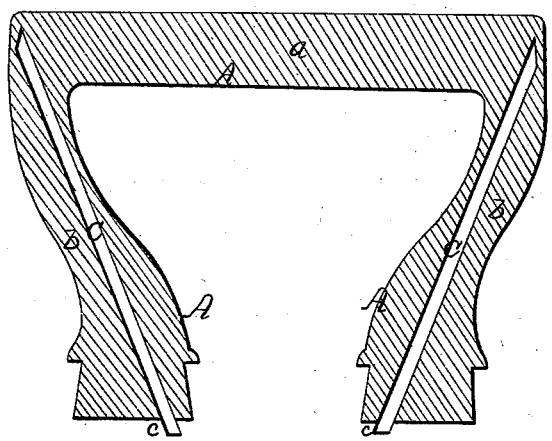
Fig 2.
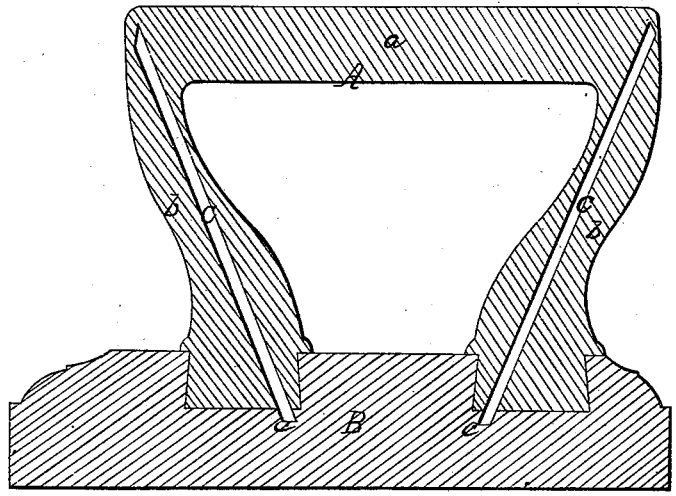
Fig 3. Fig 4.
 
Witnesses.
Thos. T. Parker
E. J. Brown.
Arad Barrows,
By his atty.
J. S. Brown.

United States Patent Office.

ARAD BARROWS, OF PHILADELPHIA, PENNSYLVANIA.

Letters Patent No. 82,677, dated October 6, 1868.

IMPROVEMENT IN SAD-IRON HANDLE.

*The Schedule referred to in these Letters Patent and making part of the same.*

TO ALL WHOM IT MAY CONCERN:

Be it known that I, ARAD BARROWS, of the city and county of Philadelphia, and State of Pennsylvania, have invented an Improved Sad-Iron; and I do hereby declare that the following is a full and exact description thereof, reference being had to the accompanying drawings, making part of this specification—

Figure 1 being a central, longitudinal, vertical section of the handle of a sad-iron provided with my improvement.

Figure 2, a corresponding section of the handle, together with the body of the sad-iron, after the two are united.

Figures 3 and 4, cross-sections of the handle in different places.

Like letters designate corresponding parts in all of the figures.

My invention consists in the employment of wires, or small wrought-iron rods, inserted through the upright portions of the cast-iron handle of the sad-iron, for the purpose of securing the handle against breakage.

In making sad-irons with my improvement, the handle A is first cast, as in fig. 1, and two wires or small wrought-iron rods, C C, are respectively inserted in the upright portions, $b\ b$, of the handle, the upper ends of the wires or rods reaching up into the horizontal portion $a$. The lower ends, $c\ c$, of the wires or rods, project beyond the handle in order to hold them in position in the sand for moulding, and they may remain somewhat projecting when the body, B, of the sad-iron, is cast upon the handle, as shown in fig. 2.

The additional strength and security given to the sad-iron by this simple improvement are obvious.

I am aware that handles, such as spoon and lifting-handles, have been made of cast metal, wired throughout the centre thereof, and such I do not claim; but

What I claim as my invention, and desire to secure by Letters Patent, is—

The cast sad-iron handle A, including the wires or rods C C, constructed and arranged substantially as described, as a new article of manufacture.

The above specification signed by me, this twenty-third day of July, 1867.

ARAD BARROWS.

Witnesses:
W. N. BARROWS,
A. BARROWS, Jr.